United States Patent [19]

Ludwig et al.

[11] Patent Number: 5,642,848

[45] Date of Patent: Jul. 1, 1997

[54] TOOL FOR DRIVING FASTENING ELEMENTS INTO A RECEIVING MATERIAL

[75] Inventors: Ralf Ludwig, Sennwald; Hans Gschwend, Buchs, both of Switzerland

[73] Assignee: Hilti Aktiengesellschaft, Furstentum, Liechtenstein

[21] Appl. No.: 699,179

[22] Filed: Aug. 19, 1996

Related U.S. Application Data

[63] Continuation of Ser. No. 345,892, Nov. 28, 1994, abandoned.

[30] Foreign Application Priority Data

Nov. 29, 1993 [DE] Germany .................. 43 40 570.3

[51] Int. Cl.$^6$ .................................... B25C 1/00
[52] U.S. Cl. .................. 227/116; 227/114; 227/135; 227/138; 29/524.1
[58] Field of Search .................. 227/51, 55, 114, 227/115, 116, 135, 138, 139; 29/524.1, 525.2, 812.5; 72/391.2, 391.4

[56] References Cited

U.S. PATENT DOCUMENTS

| | | | |
|---|---|---|---|
| 3,258,835 | 7/1966 | Boggild et al. | 29/212 |
| 3,348,291 | 10/1967 | Niedzwiecki | 227/114 |
| 4,051,990 | 10/1977 | Chromy et al. | 227/10 |
| 4,131,009 | 12/1978 | Hara et al. | 29/812.5 |
| 4,178,669 | 12/1979 | Hara et al. | 29/525.2 X |
| 4,479,601 | 10/1984 | Hara | 227/51 X |
| 4,535,925 | 8/1985 | Ramey et al. | 227/55 |
| 5,193,729 | 3/1993 | Dewey et al. | 227/139 X |
| 5,213,247 | 5/1993 | Gschwend et al. | 227/10 |

FOREIGN PATENT DOCUMENTS

| | | |
|---|---|---|
| 0522996 | 3/1992 | European Pat. Off. . |
| 0535826 | 9/1992 | European Pat. Off. . |
| 7831383 | 11/1978 | France . |
| 2432642 | 7/1974 | Germany . |
| 3410007 | 3/1984 | Germany . |

*Primary Examiner*—Joseph J. Hail, III
*Assistant Examiner*—Jay A. Stelacone
*Attorney, Agent, or Firm*—Anderson, Kill & Olick P.C.

[57] ABSTRACT

A tool for driving fastening elements (40) into a receiving material (U) includes a housing (1) with a throughbore (3), a channel (5) extending transversely and opening into the throughbore, and a guide (8). A driving device (2) is axially displaceable through the guide (8). The driving device (2) has an axially extending guide tube (9) in which a ram (7) is axially displaceable. Axial displacement of the driving device (2) is converted by control elements (10a, 10b) into transverse movement of a slide (6) located within the channel (5). The slide (6) cooperates with a separation device (12) in the form of a spring-loaded pawl at a magazine (11) holding the fastening elements (40). The magazine is mounted on the housing by a quick disconnect fitting.

11 Claims, 4 Drawing Sheets

TOOL FOR DRIVING FASTENING ELEMENTS INTO A RECEIVING MATERIAL

This is a continuation application of Ser. No. 08/345,892, filed Nov. 28, 1994 now abandoned.

BACKGROUND OF THE INVENTION

The present invention is directed to a tool for driving fastening elements into a base or receiving material and includes a housing containing a driving device for delivering blows to a fastening element. The housing has a throughbore with a radially widened section located at the end from which the driving device directs blows against the fastening element. A channel is located closely downstream from the widened section and extends perpendicularly to the driving direction. A slide is displaceably positioned within the channel and serves to feed the fastening element from a storage container into the throughbore where the driving device includes a ram movably displaceable through the throughbore for driving the fastening elements.

A pneumatic nail driver with a feed slide is known from CH-PS 670 064 with the feed slide delivering nails into a driving part upstream of a driving ram. The ram extends in the axial direction of and is connected to a piston displaceable within a cylinder by compressed air. The force and the stroke of the cylinder are dimensioned so that a single blow of the ram is sufficient to drive the nail into a receiving material. With this known pneumatic nail driver it is not possible to drive a fastening element to such a depth into a receiving material whereby the trailing end face of the fastening element is spaced inwardly from the surface of the receiving material. A ram of this known pneumatic nail driver can only be displaced through a distance in the driving direction until the leading end face of the ram is located in the mouth region of the driving device.

SUMMARY OF THE INVENTION

Therefore, the primary object of the present invention is to provide a tool for driving fastening elements into a receiving material so that it is possible to fix the fastening elements at a depth into the receiving material without having to increase the weight and the structural size of the tool.

In accordance with the present invention, the tool includes a housing forming a guide within which the driving device is axially displaceable.

Due to the displaceability of the driving device within the guide in the housing, the structural size and the weight of the driving device can be kept small, since only small strokes or blows provided in sequence need to be used. Large displacement of the ram or striker are not involved because of cylinders having a large axial length, rather a cylinder is used which is displaceable within the guide.

The driving device is in an initial position prior to the driving operation. In such position, the driving device is axially displaced rearwardly to such an extent that the leading end face of the ram or striker of the driving device does not extend into the transversely extending channel in the housing. A fastening element is displaced in the transverse channel into coaxial arrangement with the axis of the ram and the fastening element is held in the channel by a U-shaped slide.

When a driving force is applied to a force transmitting element, axially rigidly connected to the driving device, an axial displacement of the driving device occurs in the driving direction, for instance if the leading end face of the housing in the driving direction rests upon the surface of the receiving material. In such an arrangement, a pressure spring is compressed and the spring is located between a trailing end of the guide and a pressure piece positioned on the force-transmitting element.

When the driving device is axially displaced, the ram moves in the driving direction and an axial displacement of the fastening element held by the slide takes place. The leading end face of the ram comes in contact with at least a part of the fastening element. When an abutment face of the driving device contacts a stop on the housing, the desired insertion depth of the fastening element has been reached. In this position the ram of the driving device extends outwardly from the mouth region of the tool. Subsequently, the ram or striker mechanism of the driving device can be actuated.

The ram or striker mechanism performs relatively short strokes provided by the pneumatic cylinder or by the motor driven crank or wobble-drive having a piston connected rigidly with the drive or moving freely within a cylinder supplying rapid consecutive blows against the trailing end face of the ram. The crank or wobble-plate drive can be driven by an electromotor.

For manufacturing and handling reasons, it is advantageous if the guide for the driving device has a tubular shape. The body of the driving device can be provided with projections or recesses extending in the axial or driving direction of the device which cooperate with matching parallel recesses or projections on the tubular guide. As an example, the guide can have four guidance channels shaped as elongated slots spaced equiangularly apart around its circumference with the guidance channels being open at least at the trailing end of the guide. Guide ribs or strips on the driving device extend into and are displaceable within the guidance channels.

Preferably, for insertion of fastening elements into partially predrilled bores of greater depths, the displaceable driving device includes a guide tube extending through the throughbore in the housing and serving to guide the ram. This guide tube is axially fixed at the leading end face of the driving device. The outer diameter of the guide tube corresponds essentially to the inside diameter of the throughbore in the housing and the inside diameter of the guide tube corresponds essentially to the outside diameter of the ram. In addition to improved guidance of the ram, the axially displaceable guide tube affords accurate positioning of the fastening element at a specific depth in the receiving material, if the ram delivers axial blows against an expansion member of an expansion dowel. The guide tube bears against a trailing end face of an expansion sleeve facing the housing of the tool.

If the expansion member of the fastening element is to be set at a location relatively deeply within the expansion sleeve, it is preferable if the length of the ram exceeds the length of the guide tube. Accordingly, the guide tube can bear against the trailing end face of the expansion tube facing toward the surface of the receiving material.

After each fastening element is set in place, it is necessary to move the driving device back into its initial position. The axial displacement of the device relative to the guide in the tool housing takes place either manually, by spring pressure, or by a pressurized medium. If the driving device is in its initial position, neither the guide tube nor the ram extend into the transverse channel in the housing.

The transverse channel serves for supplying individual fastening elements into position to be driven. Fastening elements are fed laterally and can be moved inside the transverse channel by a slide displaceable in the channel and can be oriented into alignment with the ram.

Preferably, the driving device cooperates with control elements to afford an appropriate sequence between axial displacement of the driving device within the guide in the housing and the displacement of the slide inside the transverse channel.

For manufacturing and assembly reasons, preferably the control elements are shaped as pivotable transmission levers supported at the guide. A bell crank, pivotally displaceable about a fixed point of rotation at the housing, and a basically rod-shaped element with two abutment members can form the control element, whereby the bell crank, pivotally displaceable about the fixed point on the housing, converts the axial motion of the driving device into a movement of the slide transverse to the axial movement. A first abutment of the control element shaped basically as a bar or rod coacts with an entrainment device disposed on the driving device when the driving device is moved into its initial or original position. The entrainment device is located in the leading end region of the driving device.

To attain a considerable handling advantage, a storage container, shaped as a magazine or cartridge, is detachably connected with the housing. A number of fastening elements can be fed in turn into the transverse channel from the magazine. In particular, since the fastening elements shape can be telescoped one inside the other because of their shape, it is possible to provide the transverse channel with an inclined end face. This inclined end face causes a slightly slanted position of the fastening elements as they are inserted into the transverse channel, so that at least a portion of the circumferential region of the fastening element located in the transverse channel and in the magazine does not result in a locked connection between the elements telescoped one inside the other. When a fastening element is displaced by the slide, it is again positioned into axial alignment with the ram.

To arrange a number of the fastening elements in an axially consecutive manner, it is preferable for the magazine to be tube-shaped extending parallel with the axis of the throughbore in the housing. This feature enables economical manufacture of the magazine. The fastening elements in the magazine must be acted upon by pressure forces so that the driving device can be used when working overhead, whereby an axial displacement of the fastening element within the magazine is assured when an attachment element is moved into position to be driven. The pressure force required to displace the fastening elements axially within the magazine can be provided by a spring element, in particular a coil or helical spring.

To assure replacement of the magazine, it has a separation member at its exit end. The exit end of the magazine at which the separation device is located can be connected to the housing by a quick disconnect member located in the region of the transverse channel, accordingly, the separation member is located at the exit end of the magazine from which the fastening elements are fed to the driving device.

To afford an at least partially automatic operating sequence between the feed of a fastening element to a predrilled bore in the receiving material and the fixing of the fastening element in the bore, the slide cooperates in an expedient manner with the separation device partially covering the inside cross-section of the magazine. If the driving device is moved in the driving direction, actuation of a rod-shaped control element in the driving direction occurs by means of a second abutment of the control element and the entrainment device disposed on the driving device. A stroking motion of the slide into the initial position is performed by the pivotally displaceble bell crank, whereby the slide moves the separating member out of the internal cross-section of the magazine, so that a fastening element can move into the inside cross-section of the slide in the transverse channel. Actuation of the slide again occurs shortly before the setting device arrives in its initial position, whereby the separating member can move again into the mouth region of the magazine and prevent another fastening element from moving into the transverse channel. The arrangement of the fastening element flush with the ram within the transverse channel is achieved by means of the essentially U-shaped slide, so that the fastening element is held at least on three sides.

An additional support face can be arranged within the transverse channel, so that the fastening element is held on four sides.

Preferably, the separating device is shaped as a pivotable spring-loaded pawl. Such a separating device can be manufactured economically. Another considerable advantage of such an arrangement is that a return motion of the pawl is effected by a spring element. The spring element can be a strip-shaped spring plate in connection with the magazine and the pawl. The pawl is fixed at the magazine so that it can be pivotally displaced.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
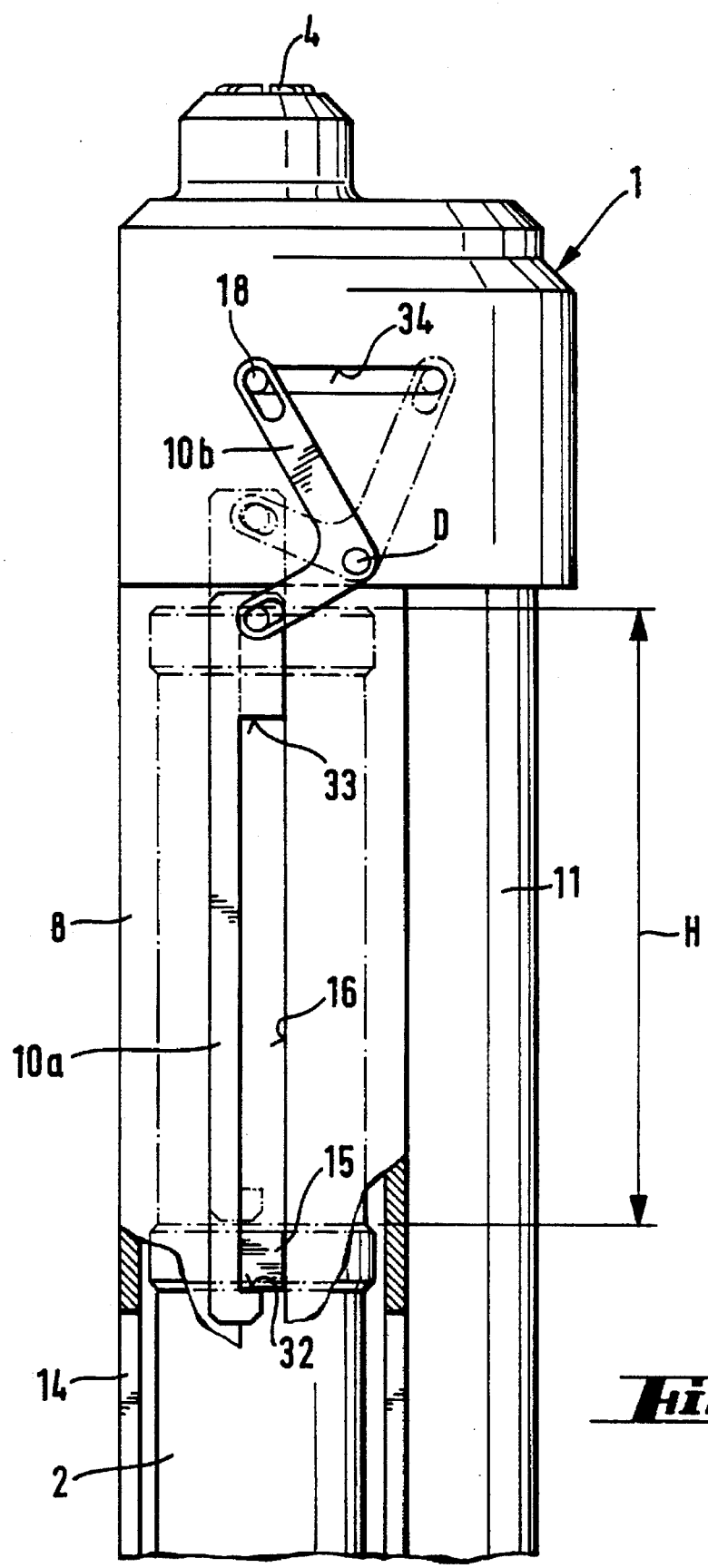
FIG. 1 is an axially extending view, partly in section, of the leading end of an automatic tool for driving fastening elements, embodying the present invention, with the tool shown in initial position.

In FIGS. 1 to 4 a tool for driving fastening elements into a base receiving material U is shown with a housing 1 and a driving device 2 for dispensing driving blows to fastening elements. As viewed in the drawings, the housing 1 and the driving device 2 has a leading end, the upper end as viewed in FIGS. 1, 2 and 3, and a trailing end as viewed in FIG. 4. The housing 1 has an axially extending radially widenable or expandable section 4 adjacent the leading end of the housing. The widenable or expandable section 4 is located at the leading end of an axially extending throughbore 3 within the housing. The housing 1 forms an axially extending tubular guide 8 within which the driving device 2 is axially displaceable. Along one axially extending side of the housing 1, an axially extending storage container 11 in the form of a tubular shaped magazine is connected and extends basically parallel to the axis of the guide 8. Control elements 10a, 10b are located on the outside of the driving device 2 for converting the axial movement of the driving device 2 into a transverse movement extending perpendicularly to the driving direction, that is, the direction toward the leading end of the housing. One of the control elements 10a is rod-shaped and has a first abutment 32 at a trailing end and a second abutment 33 at an opposite leading end. Each of these two abutments 32, 33 coacts with an entrainment member 15 located at the outside surface of the driving device 2 and guided in a groove 16 extending axially in the outside surface of the driving device 2. A pin 18 is connected to a slide 6, note FIG. 3, displaceable within the housing in a direction transverse to the driving direction, and extends from an elongated slot 34 in the housing 1. The pin 18 can be moved by a second control element 10b in the form of a bell crank which is pivotally mounted at a fixed point of rotation D on the housing 1.

Figure 2:
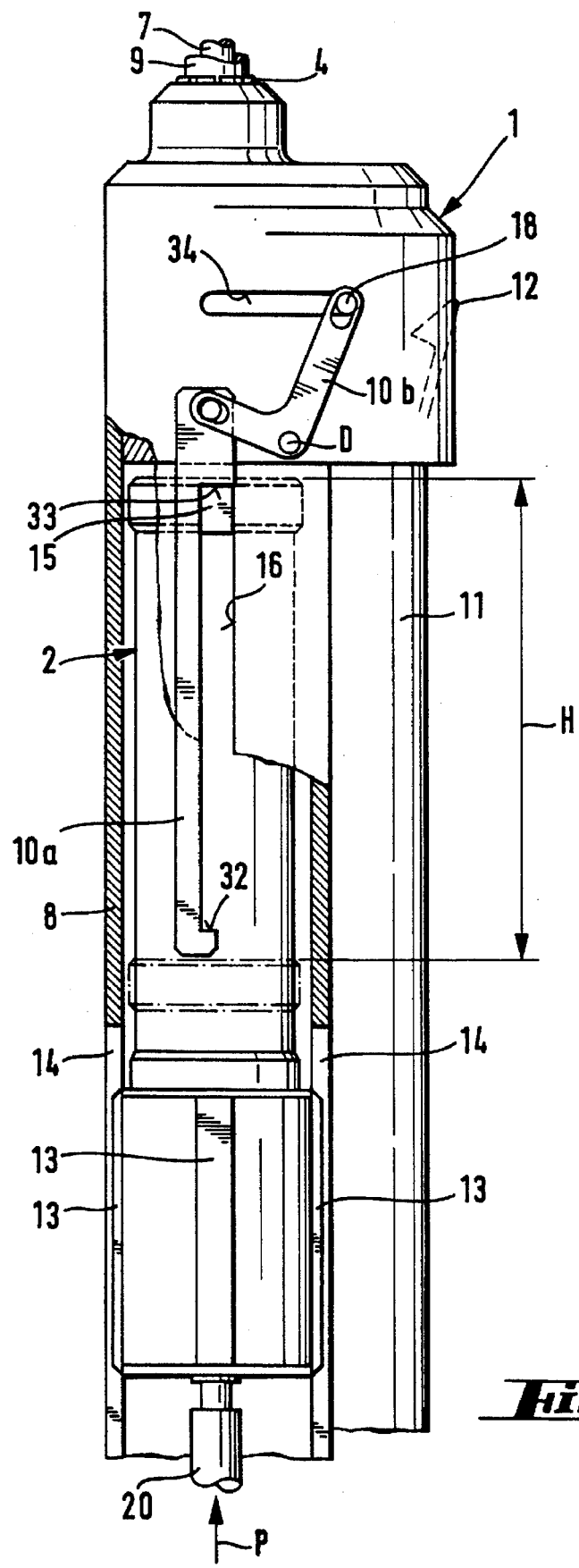
FIG. 2 illustrates the automatic tool displayed in FIG. 1, in the driving position.

Driving device 2 is axially displaceable through a single stroke H within the guide 8. FIG. 2 shows the part of the driving device 2 which provides a support within the guide 8. At least a part of the outside surface of the driving device 2 has axially extending guide strips 13 disposed in the driving direction and the strips project into slot-like guide channels 14 of the guide 8. The guide strips 13 and the guide channels 14 have corresponding widths so that the strips are axially displaceable within the channels. In the illustrated embodiment, the driving device 2 has four guide strips 13 equiangularly spaced apart around its circumference, and each guide strip 13 cooperates with a corresponding guide channel 14. At the lower part of FIG. 2 a force-transmitting element 20 is shown and the element is rigidly connected to the driving device 2. A contact pressure force P applied externally is transmitted by the force transmittal element 20 to the driving device 2 for providing its axial displacement within the guide 8 in the housing 1.

Figure 3:
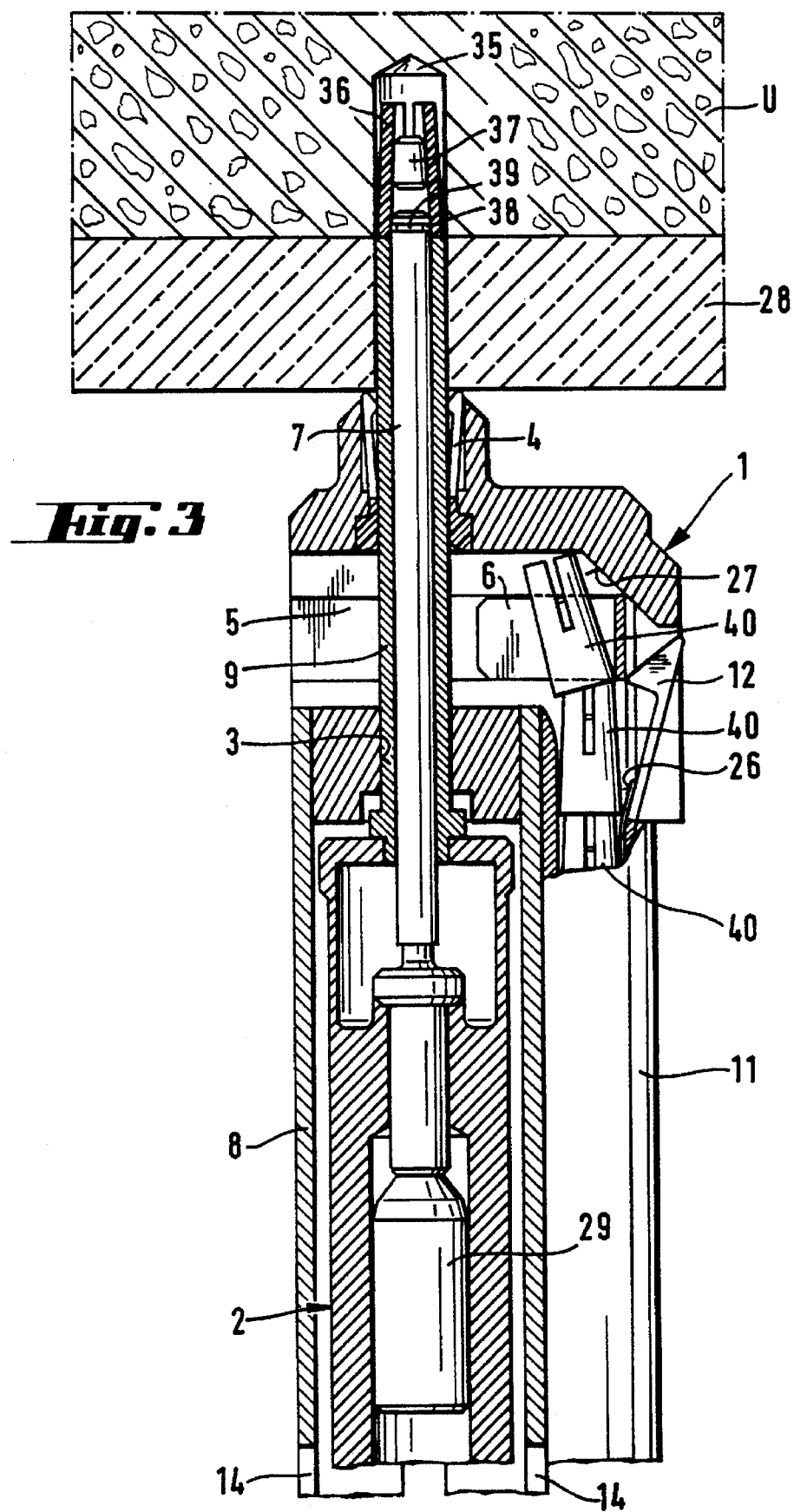
FIG. 3 is an axially extending sectional view through the leading end region of the automatic tool in FIGS. 1 and 2 and illustrated in the driving position.

While the position of the driving device 2 shown in FIG. 1 is in its initial or starting position, FIG. 2 illustrates its position for securing the fastening element in the receiving material U, as shown in FIG. 3. A guide tube 9 extends coaxially in the driving device 2 and is located at the leading end of the device. A ram 7 is located within and is displaceable with the guide tube. As shown in FIG. 3, the ram 7 in the guide tube 9 extends axially outwardly from the leading end of the housing 1. The leading end face of the housing 1 can be pressed against the surface of a receiving material so that the driving device 2 can be displaced within the guide 8 of the housing.

As shown in FIG. 3, the housing 1 has a throughbore 3 containing the radially expandable section 4 adjacent the leading end of the housing. The expandable section 4 is basically sleeve shaped with the inside surface of the sleeve corresponding to the outside surface of the guide tube 9 in a part of the sleeve which does not have axially extending slots. Inwardly directed protrusions are located in axially extending slotted regions of the sleeve, so that the inside diameter in that region is smaller than the outside diameter of the guide tube 9. The guide tube 9 extending through the expandable section 4 expands the slotted region radially outwardly. The throughbore 3 passing through the housing 1 is arranged coaxially with the axis of the driving device 2, that is, the axis extending in the trailing end-leading end direction, and has a diameter corresponding to the outside diameter of the guide tube 9. Adjacent this leading end, the housing 1 forms a transverse channel 5 extending perpendicularly to the axis of the throughbore 3 with the channel slide 6 arranged in the channel so that it is displaceable transversely of the driving direction. The movement of the slide 6 is effected by the control element 10b shown in FIGS. 1 and 2 and the internal width of the slide corresponds essentially to the largest diameter of fastening elements 40 to be supplied from the container or magazine 11. When the slide 6 is displaced, it cooperates with a separation device 12 in connection with the magazine 11 via a strip-shaped spring element 26. The magazine extends along the housing 1 substantially parallel to the guide 8 of the housing 1. The magazine 11 is fixed to the housing 1 by a quick disconnect fitting, not shown. A number of fastening elements 40 are arranged in a telescoping manner within the magazine though only three are illustrated in FIG. 3.

The right hand end of the transverse channel 5, as viewed in FIG. 3, has an entry slope 27 so that the leading fastening element 40 can be separated from the following elements due to its inclined position and subsequently oriented coaxially with the guide tube 9 or ram 7 by means of the slide 6. To permit use of the tool embodying the invention in an overhead position, a spring element, not shown, is located inside the magazine 11 and enables displacement of all of the fastening elements within the magazine as soon as the separation device 12 exposes the leading end of the magazine. The separation device 12 includes a pivotally displaceable spring-loaded pawl located on the magazine.

The guide tube 9 shown in FIG. 3 is connected as a unit with the setting device 2 and it extends through the throughbore 3 as well as through a part 28 to be attached to the receiving material U or extends through an insulation layer incapable of carrying loads with the guide tube 9 having its leading end in contact with a fastening element to be secured in the receiving material U. The fastening element 40, positioned in a predrilled bore 35 in the receiving material U is formed of an expansion sleeve 36 and a cone-shaped expansion member 37 within the sleeve. The axially displaceable ram 7 is located inside the guide tube 9 and delivers blows to the expansion member 37 after the fastening element has been inserted for the required depth of the bore 35 in the receiving material U. The ram 7 can be lifted off during the striking operation without the fastening element falling out of the predrilled bore 35, since the leading end of guide tube 9 presses against the trailing end face of the expansion sleeve of the fastening element. A clamping piece 38, in the form of a split lock washer, clamps the inside surface of the expansion sleeve in a frictionally locked manner for effecting improved retention of the expansion sleeve 36 on the ram 7 during the driving operation. The split lock washer 38 is located in a circumferentially running groove 39 in the leading end region of the ram 7. Blows are produced by a piston 29 axially displaceable within the driving device 2 when pressure is applied to the piston. In the present embodiment the piston is operated by means of compressed air, however, the compressed air channels are not illustrated.

Figure 4:
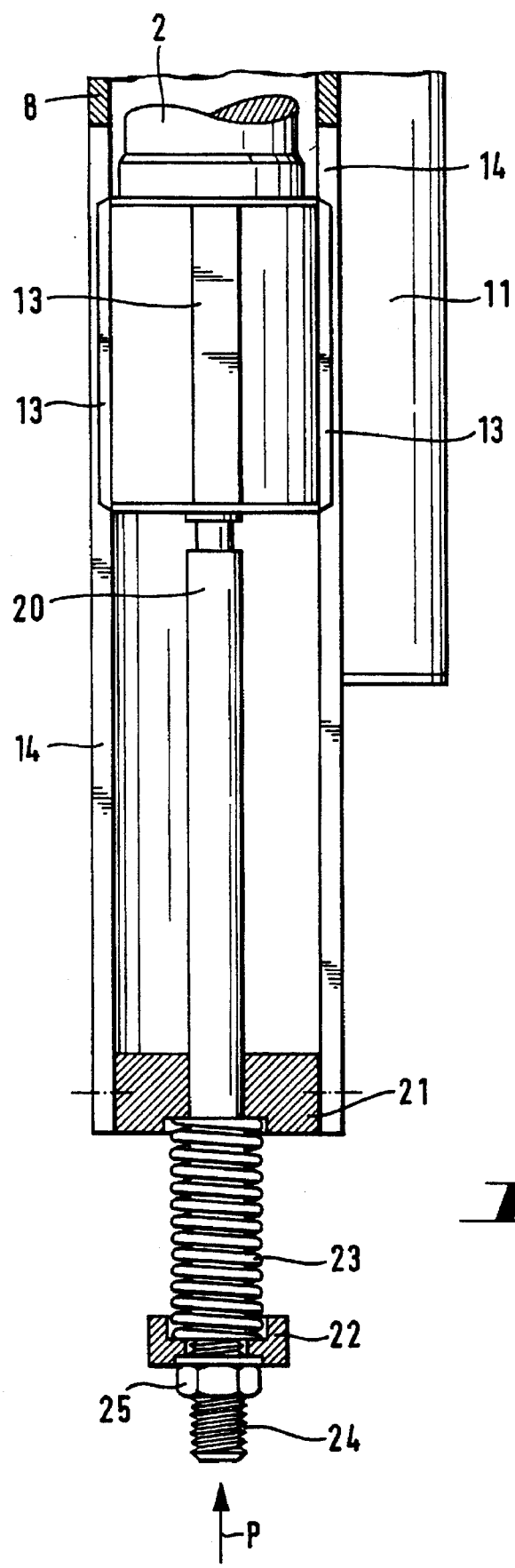
FIG. 4 is an axially extending section of the trailing end region of the automatic tool displayed in FIGS. 1, 2 and 3 and shown partly in section.

Force transmittal element 20 is connected as a unit with the driving device 2 as shown in FIG. 4. Element 20 extends through a base 21 of the guide 8 in the housing 1. Base 21 is connected to the guide 8 by simple mechanical connection elements, not shown. The guide channels 14 in the guide 8, in which the guide strips 13 of the driving device are axially displaceable, are open at the trailing end of the guide 8. The force transmittal element 20 is in the shape of a rod or bar and extends through the base 21 of the guide and has a thread 24 at its trailing end region on which an attachment nut 25 and a pressure piece 22 are secured. A pressure spring 23 is located between the pressure piece 22 and the base 21 affording axial displacement of the setting device into its initial position, as soon as the driving operation is completed.

The force transmission element 20 can be a piston rod or a cylinder connected as a unit with the base 21 of the guide piece 8. In this way, an axial displacement of the driving device 2 within the guide 8 at the housing 1 is possible, for instance by supplying compressed air.

A driving device formed in this manner need not be pressed against the surface of the receiving material by the leading end face of the housing in order to achieve a counterbearing for the contact pressure force.

While a specific embodiment of the invention has been shown and described in detail to illustrate the inventive principles, it will be understood that the invention may be embodied otherwise without departing from said principles.

We claim:

1. Tool for driving fastening elements into a receiving material comprising an axially elongated housing (1) having a first axis and an axially elongated driving device (2) having a second axis positioned within said housing for directing blows to a fastening element with said first and second axes disposed in parallel relation, said housing (1) having a leading driving end from which fastening elements are driven and a throughbore (3) extending in the direction of said first axis with an opening at said driving end, an axially extending radially expandable sleeve-like section (4) coaxial with and at a leading end of said throughbore and having a first end adjacent said leading driving end and a second end spaced inwardly from said leading driving end and tapering toward said first end of said section (4), said section being slotted in the axial direction, a source of fastening elements mounted on said housing, a channel (5) located within said housing inwardly of said second end of said section (4) and extending substantially perpendicularly to and opening into said throughbore (3), a slide (6) for receiving fastening elements from said source located within said channel (5) and displaceable therein, upon actuation of said tool, perpendicularly of said throughbore (3) toward and away from said throughbore for feeding fastening elements (40) into said throughbore, said driving device (2) comprising a ram (7) axially displaceable through said throughbore (3), means acting on said ram (7) for applying multiple blows thereto, said housing having a guide (8) extending in the direction of said first axis of said housing and through which said driving device (2) is axially displaceable, so that a leading end of said driving device projects axially outwardly from said first end of said sleeve-like section (4) and from said leading driving end of said housing and radially expands said sleeve-like section and said ram (7) arranged to direct multiple blows to an expansion member (37) within said fastening element.

2. Tool for driving fastening elements, as set forth in claim 1, wherein said guide (8) is tubular shaped.

3. Tool for driving fastening elements, as set forth in claim 1 or 2, wherein said driving device (2) comprises an axially extending guide tube (9) located within said guide (8) for guiding said ram (7), and said guide tube (9) being axially extendable through said throughbore (3) for projecting axially outwardly from said leading driving end of said housing (1).

4. Tool for driving fastening elements, as set forth in claim 3, wherein said guide tube (9) having an axial length, said ram (7) having an axial length in excess of the axial length of said guide tube (9) whereby said ram (7) extends axially out of said guide tube (9) for driving the expansion member (37) relative to the fastening element.

5. Tool for driving fastening elements, as set forth in claim 3, wherein control elements (10a, 10b) being in operative connection with said driving device (2) and said slide (6), whereby said driving device (2) displaces said control elements (10a, 10b) and one of said control elements (10b) displaces said slide (6) as said driving device (2) moves through said guide (8).

6. Tool for driving fastening elements, as set forth in claim 5, wherein said control elements (10a, 10b) include a pivotally displaceable transmission lever supported on said guide (8).

7. Tool for driving fastening elements, as set forth in claim 3, wherein said source comprises a storage container (11) for said fastening elements being shaped as a magazine detachably connected to said housing (1).

8. Tool for driving fastening elements, as set forth in claim 7, wherein said magazine (11) has a tubular shape extending substantially parallel with the first axis of said housing (1).

9. Tool for driving fastening elements, as set forth in claim 8, wherein said slide (6) cooperates with a separation device (12) formed in said magazine (11) adjacent said slide and partially covering a dispensing end of said magazine (11).

10. Tool for driving fastening elements, as set forth in claim 9, wherein the separation device (12) is formed as a pivotally displaceable spring-loaded pawl (26).

11. Tool for driving fastening elements, as set forth in claim 3, wherein said ram (7) being axially extendable through and outwardly from said guide tube (9) projecting axially outwardly from said leading driving end of said housing (1).

* * * * *